April 16, 1968  J. T. THOMPSON ET AL  3,377,743

HEAT GENERATOR

Filed April 11, 1966  4 Sheets-Sheet 1

INVENTORS
JAMES T. THOMPSON
ROSS M. HOLDEMAN
BY *Newton, Hopkins,
Jones & Ormsby*

ATTORNEYS

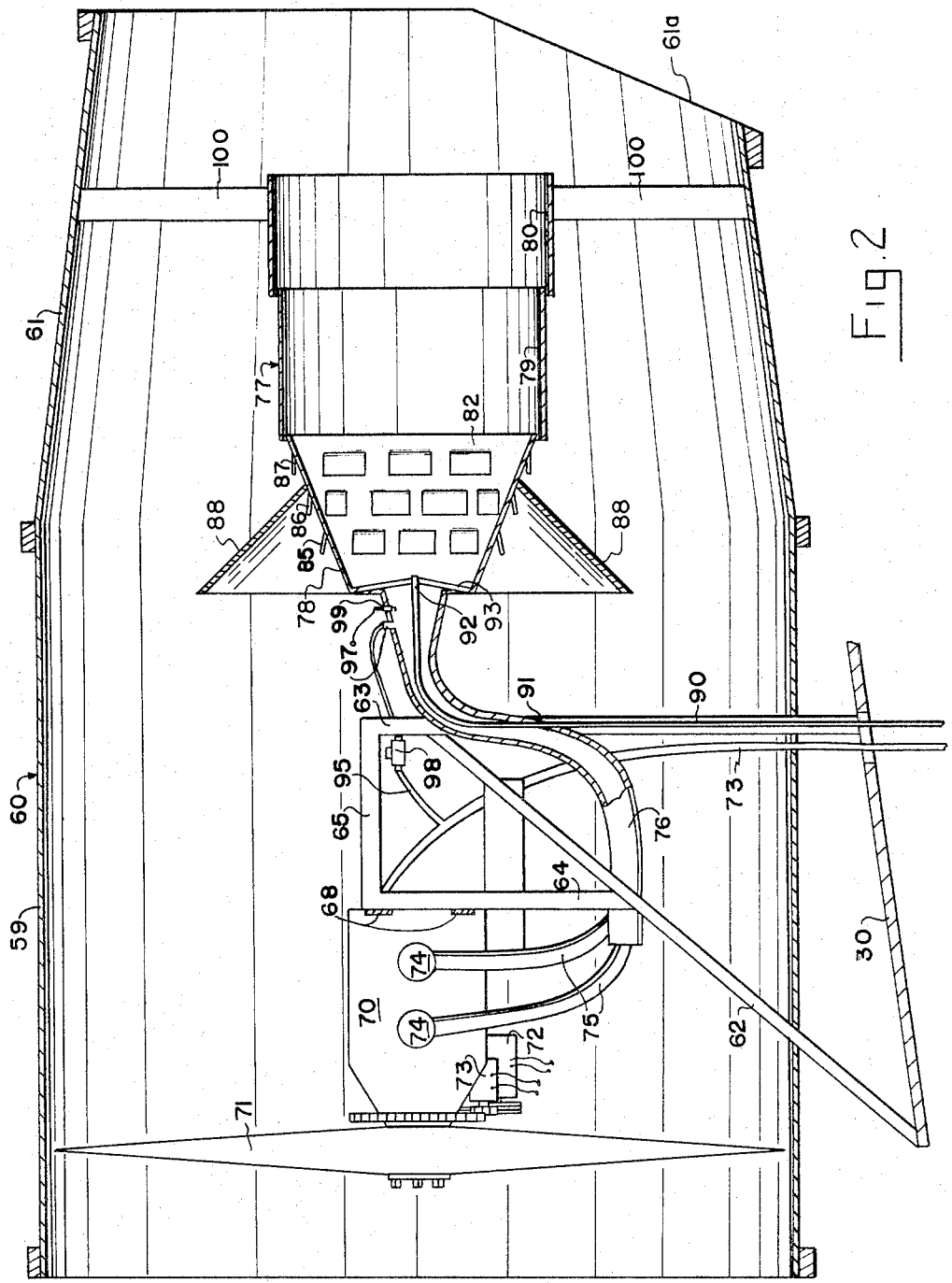

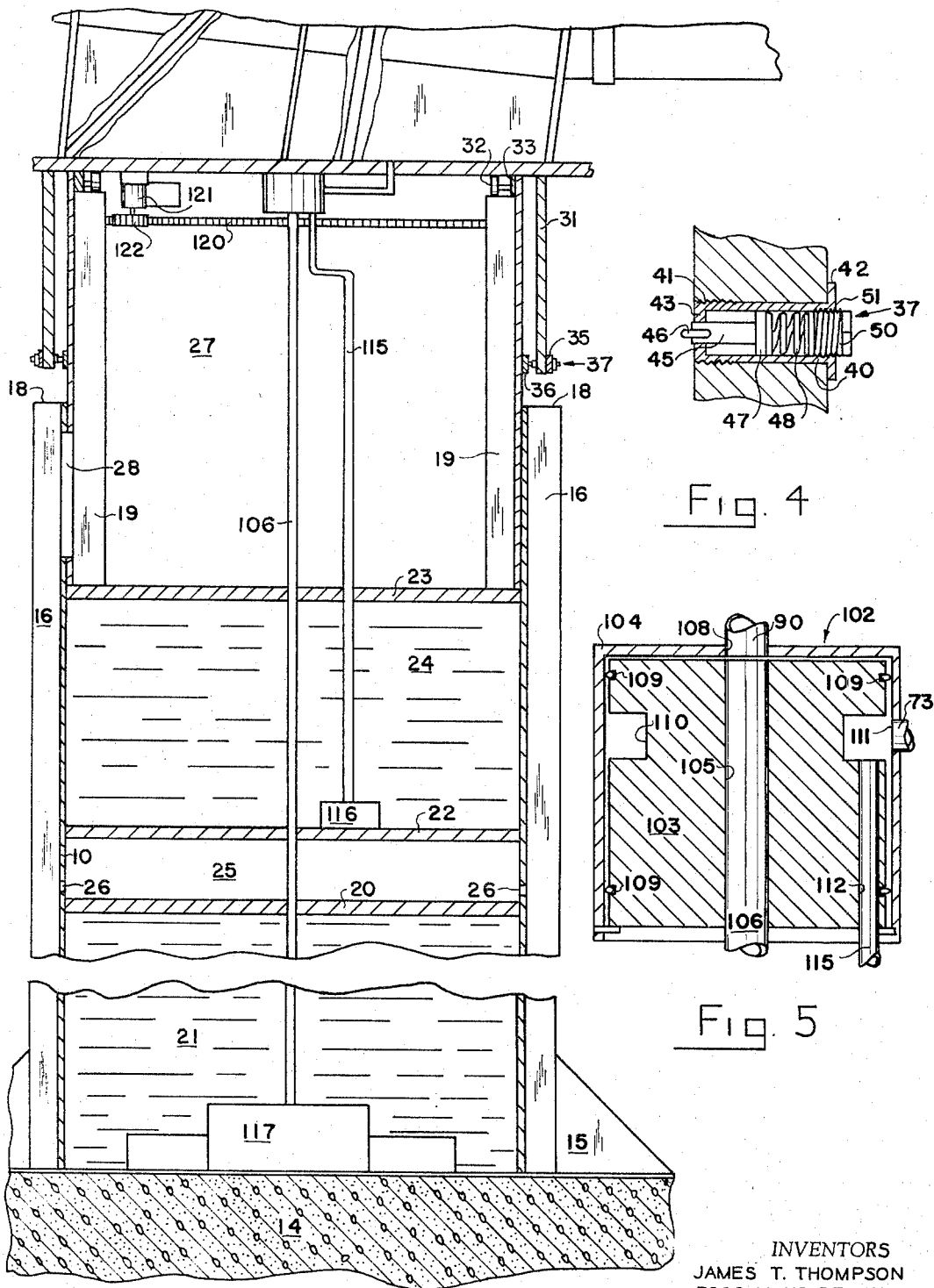

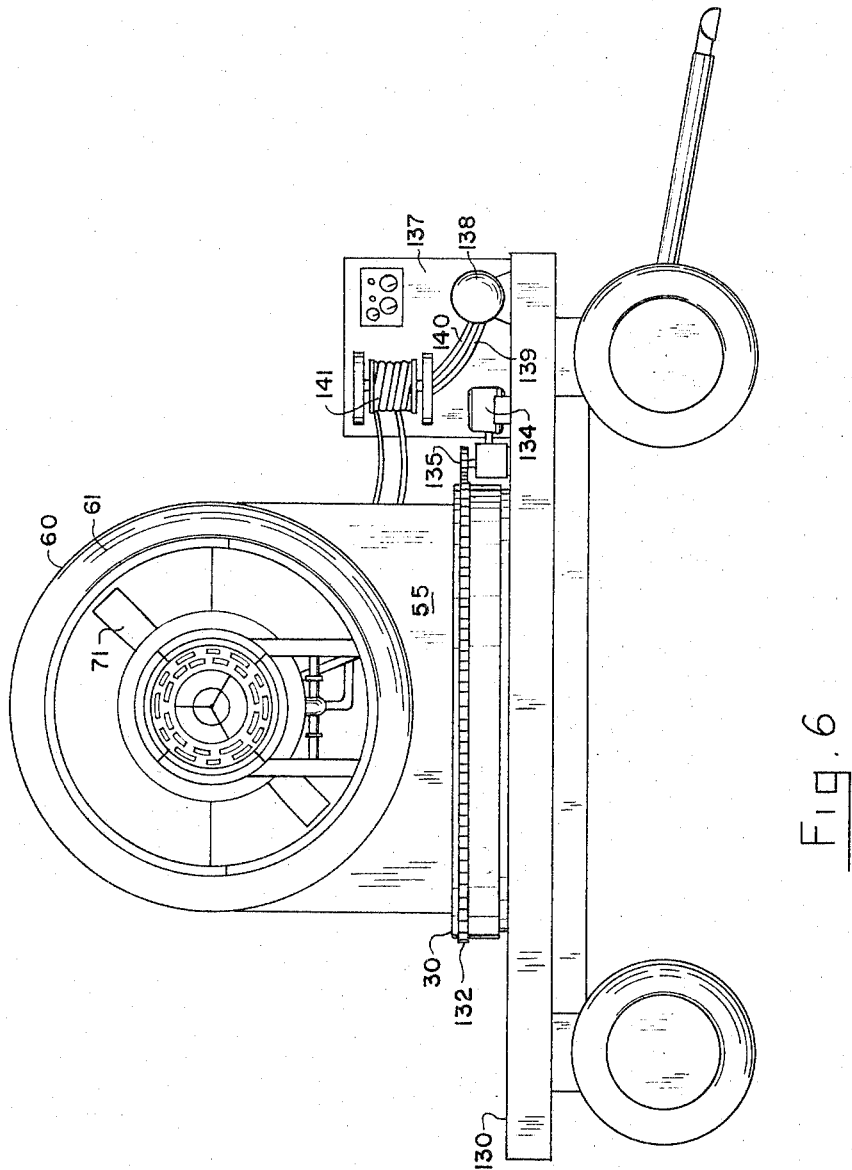

United States Patent Office 3,377,743
Patented Apr. 16, 1968

3,377,743
HEAT GENERATOR
James T. Thompson, 635 Ruby, Orlando, Fla., and Ross M. Holdeman, 512 Allen Road NE., Atlanta, Ga. 30324
Filed Apr. 11, 1966, Ser. No. 541,562
10 Claims. (Cl. 47—2)

ABSTRACT OF THE DISCLOSURE

A heat generator for heating orchards, comprising a tower, a shroud rotatably mounted on the tower, an engine driven propeller in the shroud, and a burner can positioned downstream from the propeller. The shroud converges to a narrower diameter downstream from the propeller to increase the velocity of the air after it passes the engine and as it passes about the burner can.

---

It is commonly known that the main threat to orchard growers is cold weather. In the past, various methods have been used in an attempt to prevent the fruit and plants in the orchards from freezing and being damaged by cold weather. Smudge pots and the like have been commonly used in these attempts; however, smudge pots and other similar devices meet with limited success since the heat therefrom has no directional control and the warm air merely drifts with the wind. Also, a large amount of heat generated by smudge pots, and the like, is lost since the heat therefrom tends to rise above the smudge pot, having no effect upon the crop. It is estimated that in a no-wind situation only 27% of the heat generated by a smudge pot is effective to heat the air surrounding the crop. The remainder of the air apparently is lost to the atmosphere above the crop.

Summary of the invention

Accordingly, the present invention is an orchard heat generator that draws in air from around the plants in the orchard, approximately 50% from around the trees of a typical orange grove, heats the air, and directs the air back out into the orchard with a predetermined amount of turbulence and directional control in such a manner that a minimum amount of heat is lost through convection and radiation losses.

Accordingly, an object of this invention is to provide a method and apparatus for selectively heating an area with maximum economy and efficiency.

Another object of this invention is to provide a method and apparatus for selectively forcing heated or unheated atmospheric air into the vicinity of plants in an orchard to prevent frost on the leaves of the plants, or to prevent the plants from freezing.

Another object of this invention is to provide an apparatus for heating orchards which can be selectively mounted on a portable platform or a stationary platform.

Another object of this invention is to provide an apparatus that makes maximum use of radiant and convective heat generated from a burner, when directing said heat toward the plants of an orchard.

Numerous other objects, features and advantages of the present invention will be apparent from consideration of the following specification, taken in conjunction with the accompanying drawing, in which:

Brief description of the drawing

FIG. 2 shows a cross sectional view of the upper portion of the orchard heat generator, showing the details of the shroud, burner can and engine;

FIG. 3 is a partial cross sectional view of the lower portion of the permanent installation of the orchard heat generator, showing the details of the fuel tanks and the method of rotating the upper portion with respect to the lower portion;

FIG. 4 is a partial cross sectional view of the bearings located between the rotating portion and the stationary portion of the tower in the permanent installation;

FIG. 5 is a cross sectional view of the fuel line adapter, showing the method utilized to transfer fuel from stationary fuel lines to rotating fuel lines; and, FIG. 6 is an elevational view of another form of the invention, showing the rotational portion of the invention mounted on a portable platform.

Description of the preferred embodiments

Figure 1:
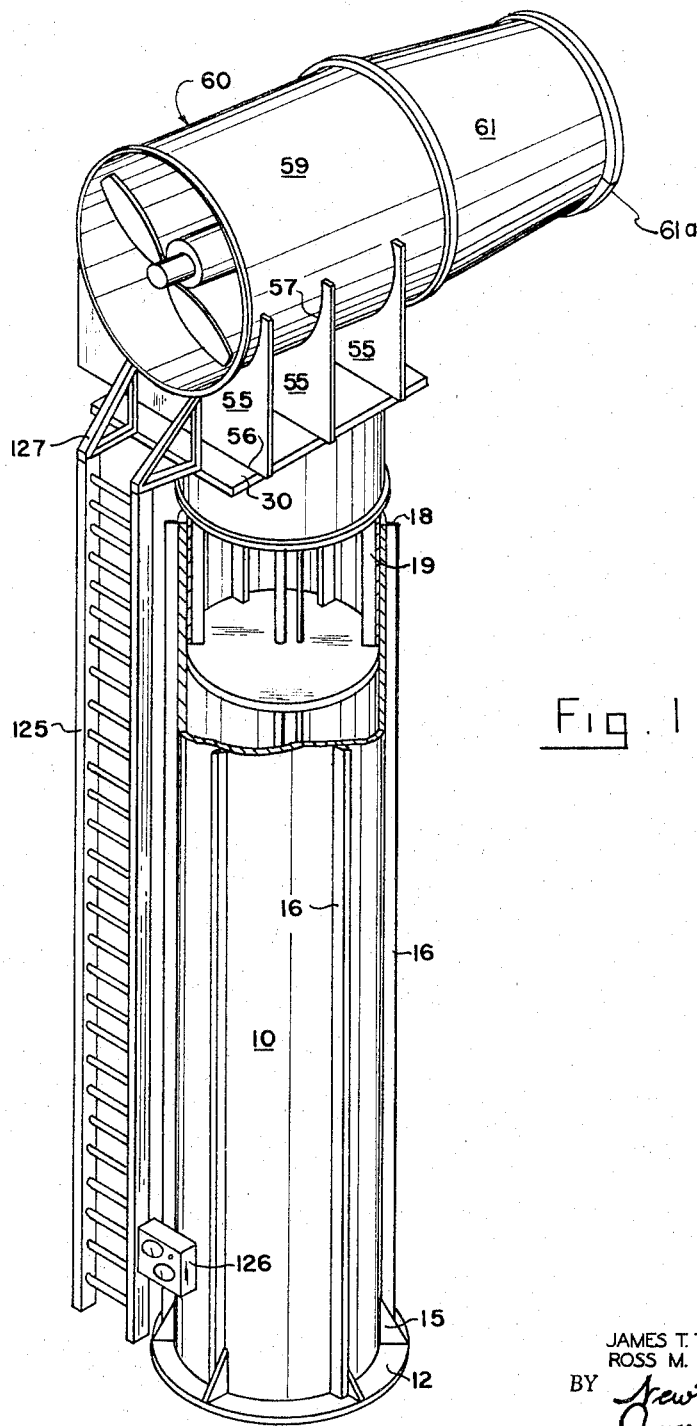
FIG. 1 is a perspective view, with parts broken away, of the orchard heat generator, showing the device mounted on a permanent installation.

Referring now more particularly to the drawings, FIG. 1 shows a cylindrical tower 10 mounted on a suitable base 12 which is anchored in concrete 14. The base 12 has triangular supporting members 15 extending upwardly therefrom and abutting the tower portion 10. The tower 10 is constructed of relatively thin material, such as sheet metal, and is supported around its circumference by a plurality of vertical beams 16 which abut the base portion 12 and supporting members 15 at their lower ends. The vertical beams 16 extend upward a substantial portion of the tower 10. Near the upper portion of the tower 10 the vertical beams 16 terminate at the point 18 and the tower 10 extends upwardly beyond the terminal point 18 of the vertical beams 16. Vertical beams 19 are disposed inwardly of the tower 10 such that the lower portions thereof are jutaxposed the upper portions of the vertical beams 16. The vertical beams 19 extend upwardly beyond the terminal point 18 of the beams 16 such that the tower has an exterior surface at its upper end which is cylindrical, without any projections, such as the vertical beams 16, extending therefrom.

The lower portion of the tower 10 is closed at its bottom end by the base 12 and at a point above the base by the separator disc 20, so that the lower portion of the tower 10 between the base 12 and the separator disc 20 is closed and can be utilized as a storage tank 21 for fuel and the like. Another separator disc 22, similar to separator disc 20 is displaced above separator disc 20; and a third separator disc 23 is positioned above separator disc 22. Each separator disc 20, 22 and 23 isolates a portion of the tower, and the portion 24 between the separator discs 22 and 23 is fluid tight and utilized as a fuel tank 24 for gasoline, or the like. The space 25 between separator discs 20 and 22 is ventilated at 26, as shown in FIG. 3, so that the space 25 has air freely circulating therein. The space 27 above the separator disc 23 is also open at the manhole opening 28 so that air is free to circulate therein.

Mounted above the tower 10 is a platform 30 which has a cylindrical skirt 31 extending downwardly therefrom, which is slightly larger than the tank 10. The cylindrical skirt 31 is adapted to be telescopically received by the tank 10, in such a manner that the vertical beams 19 are juxtaposed the lower surface of the platform 30. The vertical beams 19 each have a bearing 32 disposed thereabove, the bearings being connected to an annular ring 33 which rests on the upper end of the vertical beams 19. The bearings 32 are of conventional design and allow the platform 30 to rotate freely with respect to the vertical beams 19.

The cylindrical skirt 31 has an annular ring 35 at its lower end which is concentric with an annular ring 36, the annular ring 36 being attached to the tower sidewall. the annular ring 35 has a plurality of bearings 37 placed circumferentially therearound at equal angles. As shown in FIG. 4, the bearings 37 comprise a sleeve element 40 which has external threads 41 and a cap 42. The sleeve element has a hollow interior portion and is counterbored to form an inwardly projecting flange 43. A bearing element 45 is inserted into the sleeve through the cap 42 until it extends through the flange 43. The bearing element 45 has at one end a conventional ball bearing 46 and an enlarged head portion 47 at the other end. A spring 48 biases the bearing element 45 through the flange 43 so that the bearing 46 will engage a surface with a predetermined amount of force. A plug 50 is externally threaded and fitted into the interior threads 51 of the cap 42 so that the spring 48 is compressed between the plug 50 and the enlarged head portion 47 of the bearing element. With this arrangement, it can be seen that the bias exerted on the spring 58 by the plug 50 can be adjusted by rotating the plug so that it projects further into the sleeve element 40. If the bearing element does not come into engagement with a surface, the head portion 47 will prevent the spring 58 from pushing the bearing element out of the sleeve element by engaging the flange 43.

The bearings 32 and 37 are arranged so that the weight of the platform 30 and the apparatus which it supports rest generally on the bearings 32, while the platform is centered by the bearings 37. Also, the bearings 37 tend to transmit any twisting moments from the platform 30 and the apparatus it supports to the tower 10 in such a manner that the platform 30 will always lie flat above the beam 19. While the bearings transmit the twisting from the platform 30, they also prevent frictional contact between the cylindrical skirt 31 and the upper concentric portion of the tower 10. This arrangement provides for completely smooth and free rotation between the platform 30 and the lower portion of the apparatus.

Referring to FIG. 1, the platform 30 supports a plurality of vertically extending support elements 55 which have a flat edge 56 resting on the platform 30 and a semi-circular edge 57 extending upwardly away from the platform 30. The support elements 55 are disposed in parallel relationship with each other so that their semi-circular edges 57 are arranged to support a cylindrical portion 59 of a shroud 60. The shroud 60 is tilted at an angle of approximately seven degrees (7°) with the horizontal and has attached to one end thereof a converging portion 61 which is in the form of a truncated cone which is co-axial with the cylindrical shroud 60. The converging portion 61 of the shroud is truncated at its rear, lower area 61a.

As is shown in FIG. 2, the shroud 60 has an angle support member 62 and a vertical support member 63 extending upwardly from the platform 30. The angle support member 62 is joined to the support member 63 at its upper end and the horizontal support member 65 extends forwardly from the vertical suport member 63 and is joined at its forward end by another vertical support member 64, which extends downward therefrom and adjoins the angle support member 62. The vertical support member 64 has mounting blocks 68 attached thereto, which in turn support an engine 70.

The engine 70 is of conventional construction, such as an automobile or aircraft engine, and has a propeller 71, generator 72, starter 73 and a plurality of reciprocating piston-cylindrical elements generally shown at 74. The engine 70 is mounted so that its propeller 71 is co-axial with the shroud 60 and should extend over the propeller. The gasoline fuel line 73 feeds gasoline to the engine 70 from below the platform 30 and an exhaust manifold 76 receives the exhaust gasses from the engine 70 through the conduits 75.

A burner can 77 is mounted in and co-axially with the shroud 60 mainly in the converging portion 61 behind the engine 70. The burner can is composed generally of three portions: a truncated conical portion 78 and two cylindrical portions 79 and 80, all of which are co-axial with each other. The truncated conical portion 78 has a larger end 82 which is slightly smaller in diameter than the diameter of the cylindrical portion 79. The diameter of the cylindrical portion 79 is slightly smaller than the diameter of the cylindrical portion 80. The truncated conical portion 78 has a plurality of scoops arranged in three circular rows thereabout. The first and second rows 85 and 86, respectively, are angled so that they form a wide opening that tends to channel air into the burner can 77. The third row of openings 87 are angled so that they are disposed parallel with the surfaces of the cylindrical elements 79 and 80 and form a smaller opening than the elements 85 and 86. As is best shown in FIGS. 2 and 6, the openings 85–87 are circumferentially offset with respect to each other. A large annular air scoop 88 is disposed between the second and third rows of scoops 86 and 87, respectively.

The exhaust manifold 76 of the engine 70 is arranged so that it communicates with the smaller opening of the conical portion 78 of the burner can 77. A fuel line 90 extends up through the platform 30, into the exhaust manifold 91, into the burner can 77, and terminates in nozzle 92. The nozzle 92 is supported by the support elements 93 extending from the burner can 77. An auxiliary gasoline line 95 branches off from the gasoline line 73 communicates with the exhaust manifold 97 just at the entrance of the conical portion 78 of the burner can 77. A solenoid valve 98 is disposed in the auxiliary gasoline line 95 so as to selectively open and close the line 95. A spark plug 99 is positioned in the exhaust manifold 76 just downstream of the entry point of the auxiliary gasoline line 95 therein.

A plurality of splitters are arranged radially outwardly of the cylindrical portion 80 of the burner can 77 so that the burner can 77 is supported thereby from the converging portion 61 of the shroud 60. In this manner, the burner can receives its support from the splitters 100 at its after end and by the exhaust manifold 76 and vertical support member 63 at its forward end. The splitters 100 are composed of a relatively thin piece of material having its flat surface disposed parallel to the axis of the burner can.

As is best shown in FIG. 5, the fuel lines 73 and 90 extend downwardly from the shroud 60, through the platform 30 and into an adapter 102. The adapter 102 comprises generally the stationary element 103 and a rotating element 104. The stationary element 103 has a cylindrical bore 105 disposed axially thereof which receives a fuel line 106 therein. The rotating element 104 has an aperture 108 co-axially bored therein and receives the fuel line 90. The bores 105 and 108 are aligned with each other so that the fuel lines 90 and 106 communicate with each other. The stationary element 103 has an annular groove 110 and the rotating element has a port 111 disposed in its outer circumference so that it communicates with the annular groove 110. The stationary element has a bore 112 offset from its center which communicates with the annular groove 110. The gasoline line 115 extends through the bore 112 so that it communicates with the annular groove 110, and extends downwardly from the stationary element 103. The gasoline line 73 communicates with the gasoline line 115 through the port 111 and annular groove 110. The O-rings 109 seal the adapter so that the liquids therein will not leak therefrom or mix with each other.

The fuel line 106 and gasoline line 115 extend downwardly from the adapter 102 into the tower 10; the gasoline line 115 extending through the separator disc 23 down toward the bottom of the tank 24, and the fuel line 106 extending through the separator discs 20, 22 and 23 down toward the base 12 in the tank 21. Mounted in the tanks 24 and 21 are fuel pumps 116 and 117, respectively, which function to pump the gasoline and fuel up through their respective lines 115 and 106.

Attached to the upper interior portion on the tower 10 is a chain 120. Depending from the platform 30 is a reversible electric motor 121 having a gear 122 thereon which is arranged to mesh with the chain 120. When the motor is energized, the gear 122 rotates and walks around the stationary chain 120 so that the motor, platform, and the apparatus the platform supports, rotate around the tower 10.

As is shown in FIG. 1, a ladder 125 is supported by the platform 30 by the support means 127 so that it depends downwardly from the platform near the ground surface of the tower. Connected to the lower portion of the ladder 125 is control panel 126 which is utilized in the conventional manner to control the engine 70 and its related apparatus.

*Operation*

When it is desired to operate the device, the operator merely energizes the starter 73 with a battery (not shown), in the conventional manner, and gasoline is pumped to the engine by the pump 116 in the gasoline storage tank 24. When the engine is started, the generator 72 will generate electricity so that when the engine reaches a certain predetermined r.p.m. the generator will generate a sufficient amount of electricity to open the solenoid valve 98, and energize spark plug 99. After the engine has reached r.p.m., the operator can actuate the switch (not shown) that energizes the valve 98 and the spark plug 99 so that the gasoline pump 116 will pump gasoline through auxiliary gas line 95 to the exhaust manifold 76 in the vicinity of the smaller opening of the truncated conical portion 78 of the burner can 77. Energization of the valve 98 and the spark plug 99 causes gasoline to be pumped into the burner can and atomized substantially by the exhaust from the engine flowing through the exhaust manifolds 76. When the vapor passes the spark plug 99 it is ignited. The flame emitted from the exhaust manifold continues to burn in the burner can 77 and the air flowing through the shroud 60 aids the ignition and burning of the gasoline. Since the fuel line 90 enters the exhaust manifold 76 at 91, a substantial amount of the fuel line is in the exhaust stream within the manifold and completely surrounded by the exhaust stream in such a manner that the fuel flowing inside the line 90 will be heated to an elevated temperature before it reaches the nozzle 92. After the operator has caused the gasoline vapor to be ignited within the burner can, he is able to begin pumping fuel from the fuel tank 21 by the pump 117 up through the fuel lines 106 and 90 through the nozzle 92. Pumping of the fuel in this manner causes it to be atomized by the spraying effect of the nozzle 92 in such a manner that the fuel is substantially atomized within the burner can 77. As the fuel is sprayed by the nozzle 92, it is ignited by the gasoline flame which originates upstream of the nozzle 92. In this manner, there is no problem in igniting the fuel flowing within the fuel line 90. After the fuel oil has been ignited by the gasoline flame, the operator can actuate the switch (not shown) that closes the solenoid valve 98 to cut off the gasoline flow through the auxiliary gasoline line 95 to the manifold 74. Since the fuel oil flowing through fuel line 90 has already been ignited, the flame will not be extinguished under normal conditions of operation of the device.

The propeller 71 is housed inside the shroud 60 to a substantial extent so that the propeller and engine are protected from the weather when the device is inoperative and when operative, rotation of the propeller is highly efficient with respect to tip losses at the tip of the propeller. The air moved by the propeller is funnelled toward the entrance end of the shroud 60 from ahead of the shroud, through the cylindrical portion 59 of the shroud 60, through the converging portion 61, and out of the device. As the air is pushed through the shroud, a substantial amount of swirling motion is imparted to the air, and as the air reaches the point where the converging portion of the shroud is joined to the cylindrical portion, the air is further compressed and the velocity thereof is greatly increased by the decrease in cross sectional area of the converging portion 61. The air scoop elements 85–87 and the annular air scoop 88 in the burner can 77 act to scoop air into the burner can as it flows over the burner can so that a large amount of air is mixed with a large degree of turbulence with the fuel that is atomized in the burner can. In this manner, a large amount of air is mixed with the fuel at the point the fuel is initially atomized so that more complete ignition of the air and fuel can be accomplished within the burner can 77. The air scoops 85 and 86 are angled slightly outwardly so that a large amount of lower velocity air is channeled into the burner can while the annular scoop 88 receives higher velocity air. The concentric portions 79 and 80 of the burner can and the scoops 87 are constructed so that air can enter the burner can downstream of the annular scoop 88 to further aid in the combustion process of the fuel.

Obviously, as the fuel is burned within the burner can, the burner can becomes extremely hot so that the air flowing over the exterior surfaces of the burner can tends to be heated by the burner can through conduction and convention. Also, a high amount of radiant heat is emitted by the burner can toward the shroud 60 so that the shroud 60 also becomes heated, although to a substantially lesser degree than the burner can 77. It is estimated that the flame emitted from the heater ranges in temperature from 3,500 to 5,000 degrees Fahrenheit, while the shroud reaches a temperature of 1,700 degrees Fahrenheit. The radiant heat from the burner can tends to heat the air flowing through the space between the burner can and the heat imparted to the shroud through radiation from the burner can also tends to heat, by both convection and radiation, the air passing between the shroud and burner can. As the air leaves the converging portion 61 of the shroud, it is directed slightly inward with respect to itself so that a substantial amount of air flowing around the flame within the burner can will tend to flow through and mix with the air emitted from the whole device. In other words, while the air flowing between the burner can 77 and the shroud 61 is heated to a lesser extent than the air flowing through the burner can 77, the air from both places is mixed to some extent as it leaves the device in such a manner that an extremely sharp temperature gradient is not encountered throughout the whole diameter of the air stream leaving the shroud 60 after a predetermined distance of travel of the air.

The air splitters 100 tend to straighten out some of the air flowing between the burner can 77 and the shroud 61. Obviously, the splitters 100 are not totally effective in that the air is turbulent after it passes the splitters 100; however, the splitters 100 tend to give some directional control to the air leaving the shroud so that the generally turbulent stream of air can be directed a substantial distance from the device and the plants in a remote point in the orchard will be heated by the device. Also, since the shroud is truncated at its lower, rear portion 61a, less directional control is maintained of the air passing this point. This has the effect of streaming a small portion of turbulent air toward the ground adjacent the heater.

It has been found, through experimentation, that the positioning, size and construction of the burner can utilized in this device with relation to the shroud 60, the amount of convergence of the shroud 60 with relation to its length, and other elements are critical to the efficiency and effectiveness of this invention. For instance, a smaller burner can or one with fewer air scoops will not allow enough air to be mixed with a given portion of fuel to ignite the fuel completely to the point where maximum efficiency is maintained between air flow and fuel consumption. Also, the size of the burner can in relation to the converging portion 61 of the shroud 60 is critical in that their relationship causes the air flowing through the device to increase in velocity which is important in determining the range that the device will be effective to heat the atmosphere around the fruit in the orchard. The fact that the shroud 60 does not converge until the air flow from the propeller has passed the engine and has begun to contact the burner can is important since causing a high pressure and increased velocity within the shroud 60 near the engine and its supporting apparatus would be useless and contribute to poor efficiency since this portion of the device merely creates a drag on the flow of air without imparting any substantial amount of heat input through the air; while the converging shroud 61 tends to compress the air towards the center portion thereof in the locality of the burner can so that a maximum amount of air is caused to flow through the burner can to heat a maximum amount of air and also insure that complete ignition of the fuel takes place within the burner can.

After the device has been ignited, the operator can selectively actuate the motor 121 which turns the gear 122 that rides around the chain 120, the chain being anchored to the stationary portion of the tower 10. In this manner, the operator can run the reversible motor in one direction to rotate the shroud and its associated parts, and the adapter of FIG. 5 will allow continuous rotation of the shroud. On the other hand, if the operator so desires, the motor 121 can be reversed periodically, or not operated at all, so that shroud will direct the heat from the device over a particular area of the orchard. In this manner, the heat can be directed substantially against the wind so that when the stream emitted from the device has been substantially dissipated by the wind, it will be somewhat upwind of the orchard, and the wind will tend to carry the heated air over the orchard.

As is best shown in FIG. 6, the invention can be mounted on a portable platform, such as trailer 130. This form of the invention operates in substantially the same manner as the previously disclosed embodiment. The shroud 60 and 61 are mounted on support members 55 which in turn rest on a platform 30. A chain 132, similar to the chain 122 of FIG. 3, is attached to the lower portion of the platform 30 so that a motor 134, by means of its rotating gear 135, rotates the platform and its associated apparatus. A fuel tank 137 which has a gasoline compartment and a fuel oil compartment communicates with a pump 138 which pumps fuel through a hose 139 and gasoline through a similar hose 140 to a reel 141. The hoses leading from the reel 141 are connected to the device so that it can extend to a length that will allow the shroud to be rotated approximately 270°. By this construction, the trailer or other portable platform, can be located in the vicinity of an orchard and the shroud rotated so that the hot air blast emitted therefrom can be directed to selected areas without subsequent movement of the trailer.

While the invention has been disclosed with a burner can, and as being highly efficient in heating the atmospheric air in an orchard, it should be understood that the device can be operated without igniting fuel within the burner can so that the air flowing therethrough is heated only by the heat emitted from the engine 70. In this manner, the device merely stirs up the air in the vicinity of the orchard which, in marginal temperatures and in the case of a temperature inversion, tends to keep frost from forming on the leaves of the plants in the orchard. In other words, it is not always mandatory that the burner can be utilized since merely moving the air without heating it tends to prevent frost from forming on the leaves of the plants. Thus, the invention disclosed herein has the function of moving air through an orchard and also moving heated air through an orchard.

It will be obvious to those skilled in the art that many variations may be made in the embodiments chosen for the purpose of illustrating the present invention without departing from the scope thereof as defined by the appended claims.

What is claimed as invention is:
1. An orchard heat generator comprising in combination:
(A) a cylindrical tower having a base,
  (a) a first plurality of vertical beams extending upward from said base and spaced about the outside of said tower,
  (b) a second plurality of vertical beams partially juxtaposed the upper portion of said first plurality of beams on the inside of said tower,
  (c) the upper portion of said tower having a cylindrical external surface,
  (d) a plurality of separator discs spaced throughout the height of said tower
    (1) said separator discs defining with said tower at least two fluid tight tanks,
  (e) a pump in the lower portion of each of said tanks,
  (f) a stationary conduit connected to the outlet of each of said pumps and projecting upward in said tower,
(B) a platform mounted on the top of said tower in a substantially horizontal disposition,
  (a) said platform being freely rotatable with respect to said tower,
  (b) said platform having a cylindrical skirt depending therefrom and surrounding the cylindrical external surface of said tower
    (1) said cylindrical skirt being freely rotatable with respect to said cylindrical external surface of said tower,
  (c) a ladder depending from said platform,
    (1) said ladder having a control panel attached to its lower portion,
(C) a shroud mounted on said platform,
  (a) said shroud comprising a cylindrical portion and a frusto conical portion having its larger opening connected to one end of said cylindrical portion,
  (b) said shroud having an axis disposed at an angle of approximately seven degrees with the horizontal,
  (c) support means in said shroud,
  (d) an engine supported by said support means and having a propeller mounted co-axially with said shroud
    (1) said propeller being adapted to rotate and cause air to flow into the cylindrical portion of said shroud and out of the frusto conical portion of said shroud,
  (e) a burner can mounted in said shroud, said burner can comprising
    (1) a frusto conical portion connected to said engine,
    (2) a first cylindrical portion connected to said frusto conical portion,
    (3) a second cylindrical portion connected at one end to said first cylindrical portion and at the other end to said shroud,
  (f) air scoops in said truncated frusto conical portion of said burner can,
  (g) rotating conduits communicating with said burner can and said engine,
(D) a fuel adapter associated with said platform and communicating with said stationary pump conduits at its lower end and communicating with said rotating conduits at its upper end, and
(E) means for rotating said platform and said shroud with respect to said tower.

2. Apparatus for heating atmospheric air comprising a shroud having a cylindrical portion and a truncated conical portion, an engine mounted in said cylindrical portion of said shroud and having a propeller attached thereto, said propeller being arranged to be rotated by said engine to propel air first through said cylindrical portion and then through said truncated conical portion of said shroud, a burner can mounted within the truncated conical portion of said shroud, said burner can being of an overall conical configuration, open at its ends, with its wider opening nearest the smaller opening of said truncated conical portion of said shroud, and having a plurality of air scoops struck therefrom and facing the propeller, an annular air scoop surrounding the burner can adjacent the cylindrical portion of said shroud, and means for rotating said shroud.

3. The invention as described in claim 2 and further comprising means for conveying fuel to said burner can from a remote point, and means for heating the fuel as it is conveyed to the burner can.

4. A heating device as described in claim 3 and further comprising a second means for conveying a different fuel to said burner can and means for igniting the fuels.

5. A heating device as described in claim 2 wherein said burner can comprises a truncated conical portion, a first cylindrical portion slightly larger in diameter than the largest diameter of said truncated conical portion, and a second cylindrical portion slightly larger in diameter than said first cylindrical portion, said truncated conical portion having the plurality of air scoops therein and a nozzle substantially centrally located within said truncated conical portion of said burner.

6. The invention of claim 2 and further comprising a base having a cylindrical portion projecting upwardly therefrom, a platform supported by said cylindrical portion, said platform having a cylindrical skirt depending therefrom and telescopically receiving said cylindrical portion, said platform and said cylindrical skirt being freely rotatable with said cylindrical portion, said shroud mounted on said platform, and said means for revolving said shroud being connected between said platform and said cylindrical portion.

7. Apparatus for heating atmospheric air comprising an elongate open ended shroud, an engine having exhaust ports mounted within said shroud, a propeller rotated by said engine whereby air is caused to flow through said shroud, a burner can mounted within said shroud downstream of said engine, the exhaust ports of said engine communicating with the interior of said burner can, means for injecting fuel oil into said burner can, means for injecting gasoline into said burner can, and means for igniting said gasoline.

8. Apparatus for heating atmospheric air as described in claim 7 and further comprising means for preheating said fuel oil.

9. Apparatus for heating atmospheric air as described in claim 7 and further comprising means for increasing the velocity of air as it flows through said shroud.

10. Apparatus for heating atmospheric air comprising an elongate open ended shroud of converging diameter, an engine mounted in said shroud adjacent the larger end thereof, a propeller mounted in said shroud at the larger end thereof and rotated by said engine in such a manner as to pull air into said shroud and push air over said engine, a generally conical shaped burner can mounted in said shroud downstream of said engine with its larger end adjacent the smaller end of said shroud, at least one annular air scoop surrounding the burner can and facing the propeller, and a plurality of air scoops struck from the burner can and circumferentially spaced about the burner can, means for injecting fuel oil into said burner can, means for injecting gasoline into said burner can, and means for igniting said gasoline.

References Cited

UNITED STATES PATENTS

| 2,491,201 | 12/1949 | O'Donnell et al. | 158—76 X |
| 2,972,208 | 2/1961 | Martin. | |
| 3,121,295 | 2/1964 | Robinson | 47—2 |
| 3,240,478 | 3/1966 | Marks | 263—19 |

FOREIGN PATENTS 217,767  10/1961  Austria.

CHARLES J. MYHRE, *Primary Examiner.*